United States Patent
Frenette et al.

(10) Patent No.: US 8,396,446 B2
(45) Date of Patent: Mar. 12, 2013

(54) TWO WAY VOICE COMMUNICATION THROUGH GSM WITH ALARM COMMUNICATION

(75) Inventors: Stephan Frenette, Montreal (CA); Jitendra Patel, Mississauga (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 502 days.

(21) Appl. No.: 12/560,080

(22) Filed: Sep. 15, 2009

(65) Prior Publication Data
US 2011/0065414 A1    Mar. 17, 2011

(51) Int. Cl.
H04M 11/04 (2006.01)
(52) U.S. Cl. ............... 455/404.1; 455/401.1; 340/3.1; 340/5.2; 340/10.2; 340/539.22; 379/39
(58) Field of Classification Search ......... 455/404.1, 455/414.1, 418, 404.2, 457, 456.1; 340/3.1, 340/5.2, 10.2, 539.22, 506; 379/39; 368/11, 368/250
See application file for complete search history.

(56) References Cited

U.S. PATENT DOCUMENTS

| | | | | |
|---|---|---|---|---|
| 7,027,808 B2 * | 4/2006 | Wesby | | 455/419 |
| 7,920,841 B2 * | 4/2011 | Martin et al. | | 455/404.1 |
| 8,022,807 B2 * | 9/2011 | Martin et al. | | 340/5.2 |
| 2005/0134450 A1 * | 6/2005 | Kovach | | 340/506 |
| 2005/0222933 A1 * | 10/2005 | Wesby | | 705/36 |
| 2008/0309450 A1 * | 12/2008 | Martin et al. | | 340/3.1 |
| 2008/0311878 A1 * | 12/2008 | Martin et al. | | 455/404.1 |
| 2008/0311879 A1 * | 12/2008 | Martin et al. | | 455/404.1 |
| 2009/0323904 A1 * | 12/2009 | Shapiro et al. | | 379/39 |
| 2010/0128571 A1 * | 5/2010 | Roh et al. | | 368/11 |
| 2010/0279664 A1 * | 11/2010 | Chalk | | 455/414.1 |
| 2010/0308990 A1 * | 12/2010 | Simon et al. | | 340/506 |

* cited by examiner

Primary Examiner — Joseph Arevalo
(74) Attorney, Agent, or Firm — Kacvinsky Daisak pllc

(57) ABSTRACT

An alarm system senses alarm conditions on a premises, reports the occurrence of an alarm condition to a remote monitoring facility and for selected alarm conditions establishes two way voice communications with a person at the monitored premises or elsewhere. Multiple modes of communication are available such as public switched telephone (audio or audio modulated data), GSM (cellular audio), GPRS (cellular packet data), GSM/SMS (cellular text), etc. The programmed processor selects the network and communication protocol to rely on data communications if only data reporting is required. When two way voice communications will be required, the processor can select a network (e.g., GSM) that can be used for both data and audio communications.

11 Claims, 3 Drawing Sheets

TWO WAY VOICE COMMUNICATION THROUGH GSM WITH ALARM COMMUNICATION

BACKGROUND OF THE INVENTION

1. Field of the Invention

Embodiments of the invention relate to alarm systems and associated methods for protecting residences, businesses and other premises. More particularly, the present invention relates to a system and method for the detection of alarm conditions and operation of a local alarm as appropriate as well as communications between the protected premises and a central station. According to one aspect, different types of alarm conditions are distinguished in an alarm system controller by whether or not two way voice communications will be attempted to follow an alarm report.

2. Discussion of Related Art

Automated home and business alarm systems, sometimes termed "security systems" or "alarm systems," comprise sensors that detect hazardous or potentially hazardous conditions at a monitored premises. In addition, control circuits are also employed that produce audible and/or visible alarm signals as warnings, and advantageously report the occurrence of alarm conditions by automated signals sent to a remote security service or authority who may respond to such signals. Among other possible alarm conditions are unauthorized entry or the unexpected presence of a person who may be an intruder, fire, smoke, toxic gas, high/low temperature conditions (e.g., freezing), basement flooding, power failure, etc. The alarm can concern any detectable condition that might lead to personal hazard or property damage. In a dire situation, an automated call for help might be directed to police or fire authorities. A typical automated message is directed to a remote security service, who may simply record the incident or may have a duty to contact a person at the premises or a person identified as associated with the account, in order to follow up with action as necessary.

Alarm systems typically comprise a plurality of sensors coupled by wired or wireless signal paths to controllers or control circuits that include a processor and programming stored in memory. The programming may support a selection of configuration options by way of switches, preliminary programming selections and the like. Sensor inputs typically are discerned by the type of parameter sensed, the location of the sensor, etc. In addition to autonomous sensors, a manually operated switch input may be provided, for example in the case of a wireless medical monitor worn by a person who uses a switch on a portable wireless unit to trigger a home alarm system, or in the case of a system having a "panic button" switch for signaling. By programming, the processor can be configured to respond to different sensed or switched alarm conditions in different ways.

One way that security systems protect persons and property is by generation of an alarm signal to announce a detected alarm condition. Alarm signals might be produced by operating a horn, siren, flashing light, etc. For some alarm conditions, an audible and/or visible alarm is appropriate, for example in the case of fire. For other alarm conditions, such as intrusion detection in an unoccupied premises, a silent signal sent to summon assistance may be more useful and appropriate. When a premises is unoccupied, and sometimes even when occupied, an alarm that locally announces an alarm condition is not sufficient. What is needed is to summon appropriate assistance or attention. Therefore, remote signaling capabilities are advantageous. The signaling may be programmable, for example, to select where an alarm report signal is to be sent. It might be desirable to send an alarm reporting message to the local police in the event of intrusion detection, to the local fire company in the case of a detected fire, or to an emergency service in the event of a medical emergency.

It is advantageous in addition to reporting an alarm condition that may require response by emergency services, to enable communications with persons at premises that may be occupied. Such communications may provide information that enables emergency responders to plan their response, to bring appropriate manpower and equipment as necessary. However, false alarms can occur. For example, residents sometimes fail to disarm an intruder detection sensor when moving about, entering or exiting a building with an armed security system. Voice communications are advantageous to confirm that the case is not a false alarm, to enable the security agent to determine whether the resident is under immediate threat, perhaps to prompt for assurances by asking for a security password.

A typical alarm system has sensors distributed around a premises, some associated with doors or windows, others with passageways and still others with discrete spaces such as rooms or levels (floors). The sensors can be coupled to the control circuits by wire connections or by wireless electromagnetic, optical or acoustic signal paths. Upon occurrence of a sensed parameter associated with an alarm condition, a sensor provides a signal to a controller that may be disposed at an alarm control panel. The sensor signal may derive from a switch closure or digital level or edge that is arranged to signal or trigger the controller. Alternatively, a sensor could provide an analog voltage level to a threshold detector at the controller. The sensors are either wired to discrete inputs of the controller or in a network arrangement have associated identification codes that are enrolled in the data memory of the controller, in either case to enable the individual sensor signals to be correctly interpreted, i.e., distinguished from one another so that an appropriate response is taken in view of the nature of the hazard.

When reporting the occurrence of an alarm condition to the authorities or to a security agency, it is necessary for the signal contents or the manner in which the signal is sent (e.g., the telephone number or network address to which the message is sent) to distinguish the premises that was the source of the alarm and preferably the nature of the alarm and perhaps other pertinent information such as the location of the sensor that detected alarm conditions. Conventionally, remote reporting of alarm conditions and also follow-up voice conversations to confirm or investigate and alarm, have been conducted using the public switched telephone network (PSTN). Such reporting is vulnerable to loss of connection.

In connection with unauthorized entry, a burglar or the like might sever telephone wires in an effort to disable reporting. In the event of fire or disaster, the public telephone network may not be operational. An alarm system is disclosed in US publication 2008/0240372, wherein an alternative communications path is provided over a cellular telephone network. The disclosed technique employs a programmed selection routine and a communications path selector. If the public telephone network is operational, reporting signals are sent over the public telephone network. Signaling over audio paths can comprise automated connection to a preprogrammed signal destination number, and signaling over the audio channel using a dual tone multifrequency (DTMF) decoder/driver or a frequency shift keyed modem. In any event, the signal alerts the central station to the alarm, at least identifies the source premises and may carry additional information. It is incumbent on the personnel at the security agency or central station to initiate voice communications with the monitored premises in order to verify the alarm condition or otherwise to communicate with persons who answer the phone at the monitored premises. In the referenced publication, the communications path selector can adapt when the public telephone network (PSTN) is inoperative. In that case (for example upon failure to detect a dial tone), the program can switch over to a cellular telephone network (GSM for Groupe Spécial Mobile) to attempt the call to signal the central station.

According to the communication technique in publication 2008/0240372 a GSM cellular transceiver is needed for wireless communications to a cellular telephone facility within range, such as a cell phone tower. If a transceiver is provided and coupled in data communications with the alarm system, (e.g., in association with the control panel) the referenced publication discloses a bridge system whereby calls that are initiated at one or more telephone sets on the premises, which calls normally would have been coupled to the public telephone network (PSTN), are coupled instead to the cellular transceiver that is provided for the alarm system. In this manner, calls of a general nature (not limited to alarm calls) can be made over the cellular GSM network when the public telephone network (PSTN) is inoperable.

The GSM network is useful as an alternative voice communication pathway for use when the PSTN is unavailable. The GSM protocol is one of digital communications and packet data switching. Audio voice signals are digitized, numerically compressed and sent and received using a radio frequency modem. A GSM system may have an associated General Packet Radio Service core network (GPRS), by which Internet packet data traffic likewise can be handled as TCP/IP traffic. A GSM system supports short message service (SMS), also known as text messaging.

It is useful that the GSM network can be exploited as a backup communication network, used for reporting alarms and also for general purpose when the PSTN is inoperable. However, cellular communications are more expensive than public telephone network (PSTN) calls. Both PSTN and GSM calls generally include associated encoded information identifying the calling party via a subscriber identity code (typically provided from a SIM or subscriber identity module). What would be advantageous is a way to optimize the integration of GSM, SMS, GPRS and cellular communications capabilities with an alarm panel and communication arrangement for a security alarm system. According to the present disclosure, techniques are provided to exploit the available communication paths, and not merely GSM and PSTN voice communication pathways, in ways that take advantage of the digital signaling and analog voice communications that are called for in alarm system communications, with respect to operability, speed, cost and functional effectiveness.

SUMMARY OF THE INVENTION

Exemplary embodiments of the present invention are directed to a system and method for an electronic security system. In an exemplary embodiment, an alarm system includes at least one sensor located at a protected premises where the sensor produces a sensor signal indicative of an alarm condition. An alarm controller is coupled to the sensor and includes a processor coupled to a memory. The processor is configured to distinguish among alarm conditions to be reported to the remote monitoring service based at least on whether or not a respective alarm condition requires a two way voice communication with the remote service. A communications interface is coupled between the controller and at least one communications network where the communications interface is responsive to the controller to transmit an alarm reporting signal to the remote service over the communications network, and wherein at least for an alarm condition that does not require the two way voice communications, the alarm reporting signal comprises, a digital reporting message.

In another exemplary embodiment, a method for protecting a premises having an alarm system responsive to sensors on the premises, in conjunction with a monitoring facility, includes distinguishing among multiple alarm conditions that can occur at the premises by associating with at least some of the alarm conditions a requirement to report respective alarm conditions to the monitoring facility and associating with certain of the alarm conditions a requirement to attempt to establish voice communications between the monitoring facility and the premises when such certain alarm conditions are reported. A result of distinguishing among multiple alarm conditions is stored in one of a program of a control processor and a program memory associated with the control processor. A signal from one of the sensors associated with one of the multiple alarm conditions is received at the control processor. A determination is made from one of the control processor and the program memory whether one of the multiple alarm conditions requires an attempt to establish the voice communications. For an alarm condition that requires the attempt to establish the voice communications, multiple information transmission pathways are ranked between the monitoring facility and the premises, including with respect to capability to effect two way voice communications and data communications over the connection. A determination is made as to which of the information pathways is available. The alarm condition is reported and the premises is identified in a digital message over an available one of the information pathways selected by the ranking. The voice communications is established over the one of the information pathways selected by the ranking.

DESCRIPTION OF EMBODIMENTS

Figure 1:
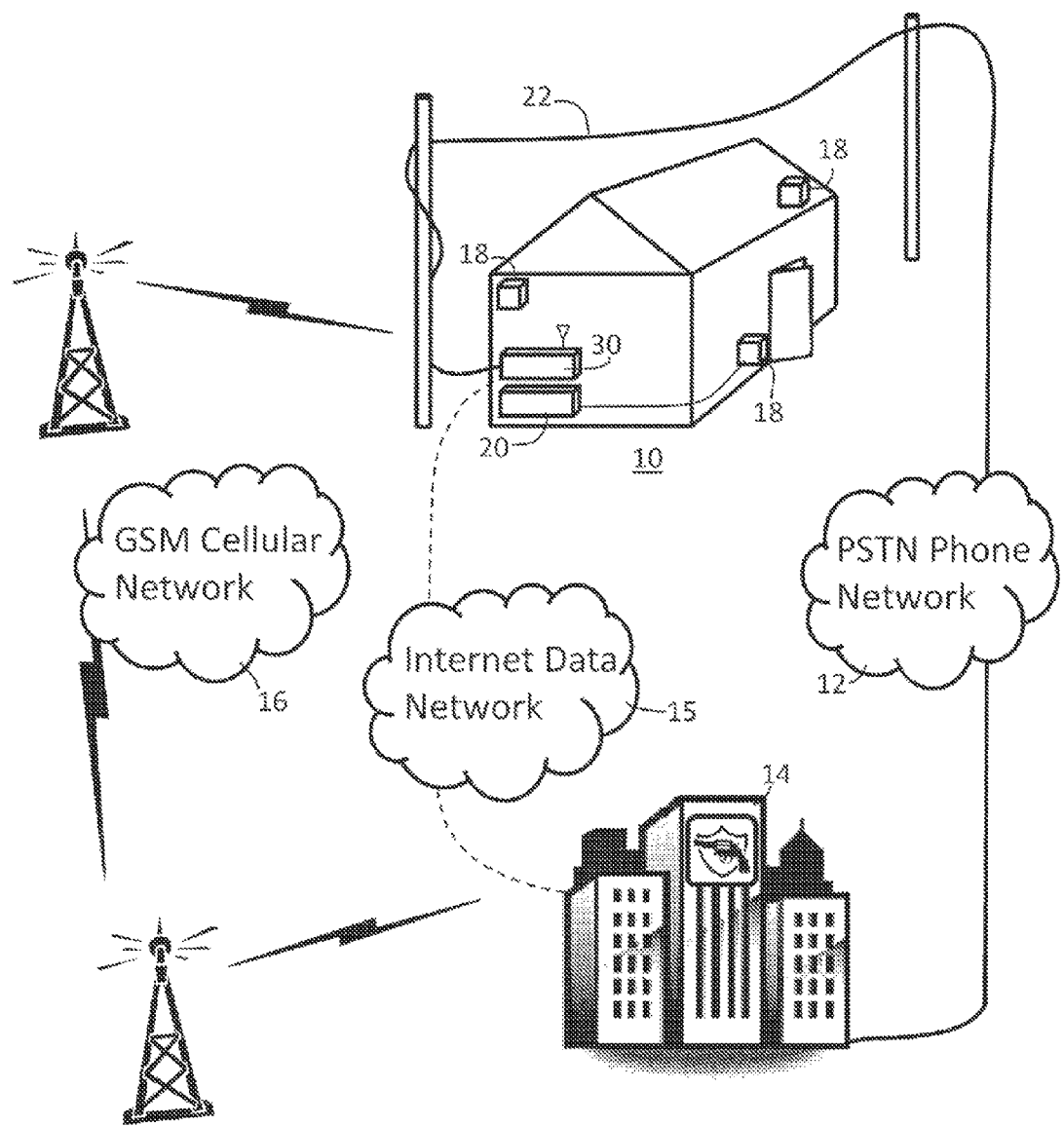
FIG. 1 is a schematic diagram of an alarm system at a monitored premises capable of communications over plural signal paths with a remote authority or service, exemplary of an embodiment of the present invention.

FIG. 1 depicts a residential or business premises 10 guarded by an alarm system including panel 20 in communication with a plurality of sensors 18. Sensors 18 may be entry sensors, flood sensors, motion detectors, smoke detectors, glass breakage sensors, or any other sensors to be monitored. Sensors 18 may also include user interface sensors/panels. Sensors 18 may be in communication with panel 20, wirelessly, by a wired interconnect, through the electric wiring of premises 10, or otherwise. The alarm system may further include other interfaces such as key pads, sirens, and the like, not specifically illustrated in FIG. 1. Panel 20 is interconnected with the PSTN 12 and in communication with at least one other communication network 16, through a network interface module 30. In the depicted embodiment, network 16 is a cellular telephone network that carries both voice and data. Cellular network 16 may, for example, be a GSM cellular network with a GPRS core for handling data packets as well as compressed digitized audio. As will become apparent, panel 20 could instead or additionally be in communication with some other network such as a wide area wireless data network, a wired data network such as the internet, or the like.

A monitoring facility 14 is in communication with PSTN 12 and GSM cellular network 16. The monitoring facility 14 is depicted as a single monitoring center and sometimes termed the "central" service or station. However, the monitoring facility can be embodied as multiple specific monitoring stations at different physical locations or as activities associated with communication businesses such telephone companies, Internet service providers or others configured for communication. Likewise, for example, some monitoring stations may be in communication with the GSM network 16, others in communication with PSTN 12 and still others served over the Internet data network 15. The monitoring facility 14 can be configured to service (i.e., to respond to) a plurality of PSTN telephone numbers, and optionally other network addresses that may be used to contact monitoring facility 14 to provide data indicative of a monitored event at a monitored alarm system including panel 20. Among other possible arrangements, the respective numbers or addresses available at monitoring facility 14 can concern different geographical areas of premises, so that called numbers identify a general location and perhaps the coverage area of emergency responders. The called numbers can also be associated with hazards, such that alarm conditions that are discriminated by sensor type, such as fire versus intrusion detection versus medical emergency, are directed to different numbers.

Figure 2:
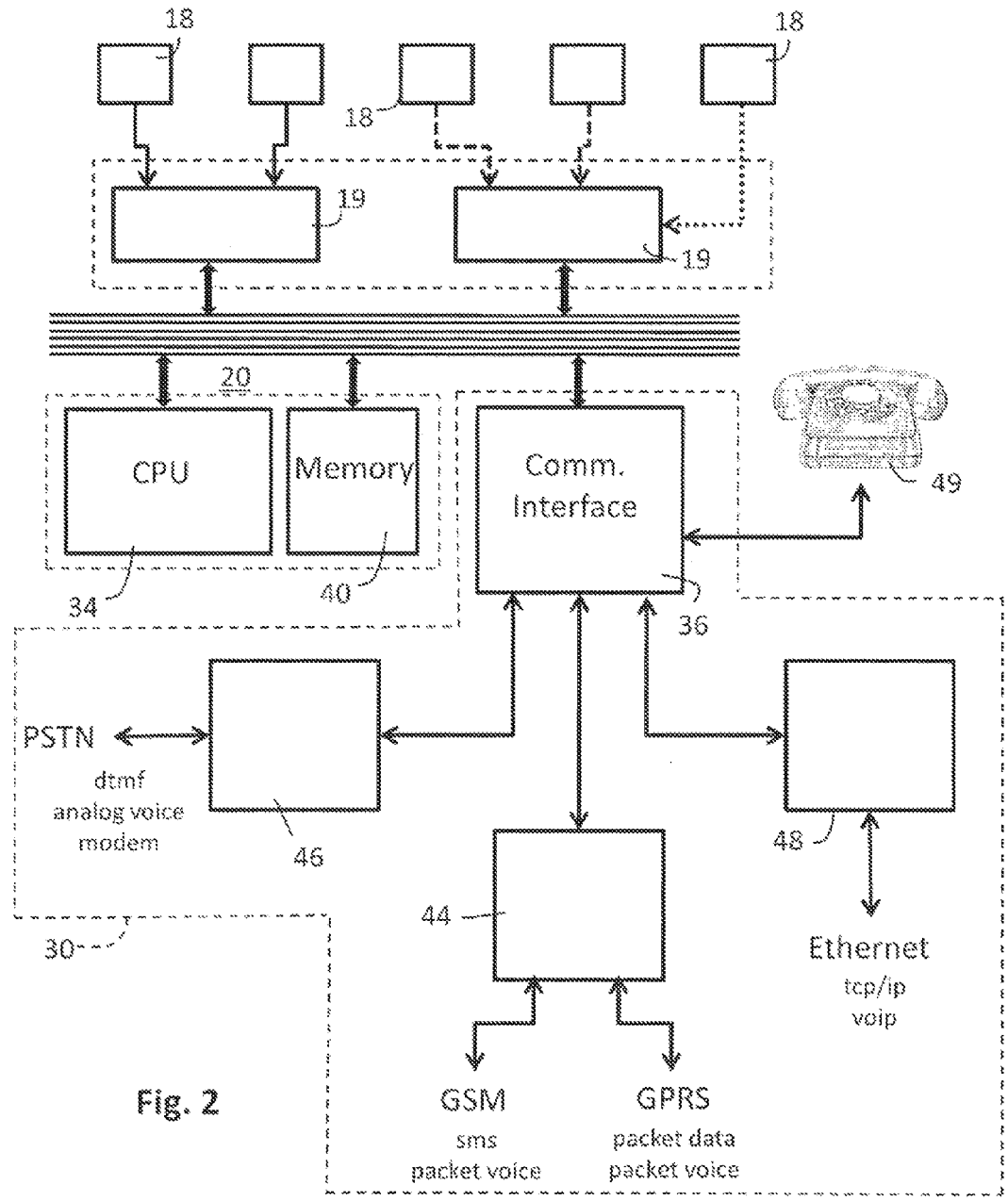
FIG. 2 is a schematic block diagram of an alarm panel and associated communications interface, as an exemplary component of the system of FIG. 1.

Referring to FIG. 2, sensors 18 communicate with controller panel 20. As a particular sensor 18 is tripped signifying a sensed condition, the sensor provides a signal to panel 20 through an interface element 19 that may be coupled electromagnetically, optically, by switch contact of otherwise as shown by the different format connecting lines between the sensors 18 and interfaces 19. The interfaces 19 can incorporate digitizers and in any event provide data in the form of status signals and flags and/or numeric values to the controller central processor (CPU) 34 via a common bus to system memory 40 which stores programming information and data. The communications interface element 30 is closely integrated with processor 34 and memory 40 via the common bus and may share access for example, by time division or gated addressing. Panel 20 in conjunction with communications interface 36 is integrated such that under control of processor 34 executing instructions in memory 40, the communications interface 36 selects one of the available network communication channels comprising GSM/GPRS element 44, PSTN 46 or otherwise available digital communications such as a home computer system or network 48 coupled to the Internet over any available connection such as a cable modem, phone line or separate GSM/GPRS packet data connection. A telephone receiver set 49 is provided on the premises and can be the premises primary voice telephone communication device. In the event that the receiver is in use when needed for communication, the alarm system control processor 34 and/or communication interface 36 preferably has the capability to terminate a call and take over control of the telephone receive 49.

Software controlling the operation of central processor 34, and hence panel 20, may be embedded in the processor or may be stored in memory external to the processor. This software may include conventional routines for overall operation of panel 20, including its interaction with sensors 18 and/or a control panel, for access and control by a user However, as programmed and integrated with the communications interface, the device comprises a special purpose processor configuration having the ability to distinguish among alarm conditions and to proceed appropriately. More specifically, the programmed processor is configured to discriminate among alarm conditions to determine which do or do not require establishing or attempting to establish two way voice communications between the monitoring facility and a user (presumably a user at the premises but potentially a user who is not on the premises but who is contacted or conferenced in the event that the premise is unoccupied or unresponsive at telephone receiver set 49). The programmed system is configured to transmit an outgoing message after detection of an alarm event. The selection of the network on which the message is sent is determined in part by the nature of the alarm condition, namely whether voice communications shall be established. Typically, the alarm condition resulted from triggering of one or more of sensors 18 when alarm panel 20 is in its armed state, and the alarm condition is known to the system because the control processor 34 is programmed to distinguish from each of the inputs from sensors 18 and interfaces 19. That is, the control processor is programmed to distinguish the nature of the respective sensors as fire or intrusion or the like, and may also distinguish sensor locations. These particulars are established during system installation and setup. Likewise, the telephone number(s), IP addresses and details regarding where calls and messages are to be directed (e.g., to monitoring facility 14) may be programmed by an installer or administrator of panel 20, and stored within memory 40. Different sensed conditions may be associated with different PSTN number(s), thereby allowing different sensed conditions to be signaled to different monitoring stations, alternate numbers, etc.

According to system programming, one or more reporting calls can be generated upon the occurrence of an alarm condition. The call to report the occurrence of an alarm condition can be configured appropriately for the entity to whom it is directed. A digital message directed to an automated system at the monitoring facility 14, for example, could comprise an encoded string of letters and numbers. In the event the number called is a programmed subscriber-contact number, a recorded or text-to-speech generated voice message may be played back to the subscriber, announcing detection of the alarm.

For a digital report to the monitoring center 14, data representative of the sensed alarm may be generated, encapsulated, and passed to the monitoring centre. The data, for example, may be encapsulated using an audio modulation technique such as dual-tone, multi-frequency ("DTMF") tones (i.e., the SIA Protocol specified in ANSI SIA DC-03-1990.01), the ContactID Protocol, as pulse code or frequency modulated data or by similar techniques. The programmed processor 34 and coupled communication interface 36 operate as a selector of one of the network interfaces 44 (GSM/GPRS for SMS, packet data or packet voice), 46 (PSTN analog voice, audio modem, DTMF), or 48(general Ethernet TCP/IP or VoIP). The GSM and GPRS interface 44 may comprises a conventional GSM/GPRS radio as typical of portable cellular telephones or telephone-PDAs containing a uniquely identified SIM. The PSTN interface 46 may comprise a conventional interface as provided on autodialer and interactive telephone dialog equipment. Alternatively, these elements can be embodied as customized combinations of active and passive components, e.g., modems, amplifiers, etc.

As detailed below, software controlling operation of processor 34 selectively controls reporting messages on a desired available network, employing voice capable or voice optimized protocols in connection with alarm reports that will proceed to a two way voice connection. In other alarm conditions where reporting is limited to a digital transmission, or a one way audio transmission, the processor selects a network or a protocol for that particular message.

At least one of a plurality of sensors 18 located at the premises 10 in an exemplary system produces a sensor signal indicative of an alarm condition. Preferably, several of the plurality of sensors are configured for distinguishing different alarm conditions, some of which require reporting alone and others of which require reporting and a two way voice session. For example, the voice session enables the monitoring service 14 to determine if the alarm is true or false, to ask a person at the premises to report additional information or perhaps to verify that the person is secure. Certain of the alarm conditions may be programmed to provide a one way voice session and still others may not require any voice session. Based on the type of alarm condition and associated information stored in a look-up table as described with reference to FIG. 3, a determination is made whether or not a two way voice session is instituted.

The system has at least one processor or similar control device forming an alarm controller 20, coupled to the sensor. The alarm controller includes a programmed processor 34 coupled to a memory 40 and configured by virtue of its inputs, preliminary setup and programming, to distinguish among alarm conditions that are to be reported to the remote service. As described, one distinction is whether or not a respective alarm condition requires a two way voice communication with the remote service 14, and the controller 34 uses that distinction to choose the data communication technique that is used to report the alarm condition to the remote service 14. A communications element 30 including a communications interface 36 coupled between the controller and appropriate modems or drivers 44, 46, 48 to interface with the different forms of the communication network. The communications interface 36 is responsive to the controller 34 to transmit an alarm reporting signal to the remote service 14 over at least one such communications network or over at least one protocol available on a communication network if, for example as in GSM, there are both voice and data communications facilities available on the same communication channels. For at least one type of alarm condition that does not require two way voice communications to ensue, the alarm reporting signal comprises a digital reporting message. For at least one other type of alarm condition, the system preferably selects a communication network that supports voice communications, although the reporting can commence with digital signals and then switch into a two way full duplex audio conversation.

The digital reporting message identifies the alarm condition and the premises. This information can be embodied in the content of the message or can be associated with the called number, address or with an identification of the calling number by caller ID code or by a SIM identification code. Among other specific techniques, the digital message can involve TCP/IP data, a text message network, modulation of one of an audio frequency and radio frequency network. An alarm condition may be determined based on a particular programming configuration. Based on this determination, voice communications are established and a digital reporting message can be transmitted using a Groupe Spécial. Mobile/Short Message Service (GSM/SMS) protocol on a wireless data communication network. Alternatively, the same report can be commenced as a GSM two way audio phone connection with initial data reporting by DTMF or the like. This latter alternative may be advantageous because the connection that is established over the GSM system can be maintained after the data reporting phase and the same connection used for the voice communication.

As mentioned earlier, at least one telephone receiver set 49 is present at the premises. The communications interface 36 can be configured to bridge the telephone receiver set into voice communications with the remote service. The digital reporting message is transmitted as a digital message on a network that is capable of carrying two way voice communication. The communications interface engages the telephone receiver set in voice communications with the remote service after reporting an alarm condition that requires the two way voice communications.

Figure 3:
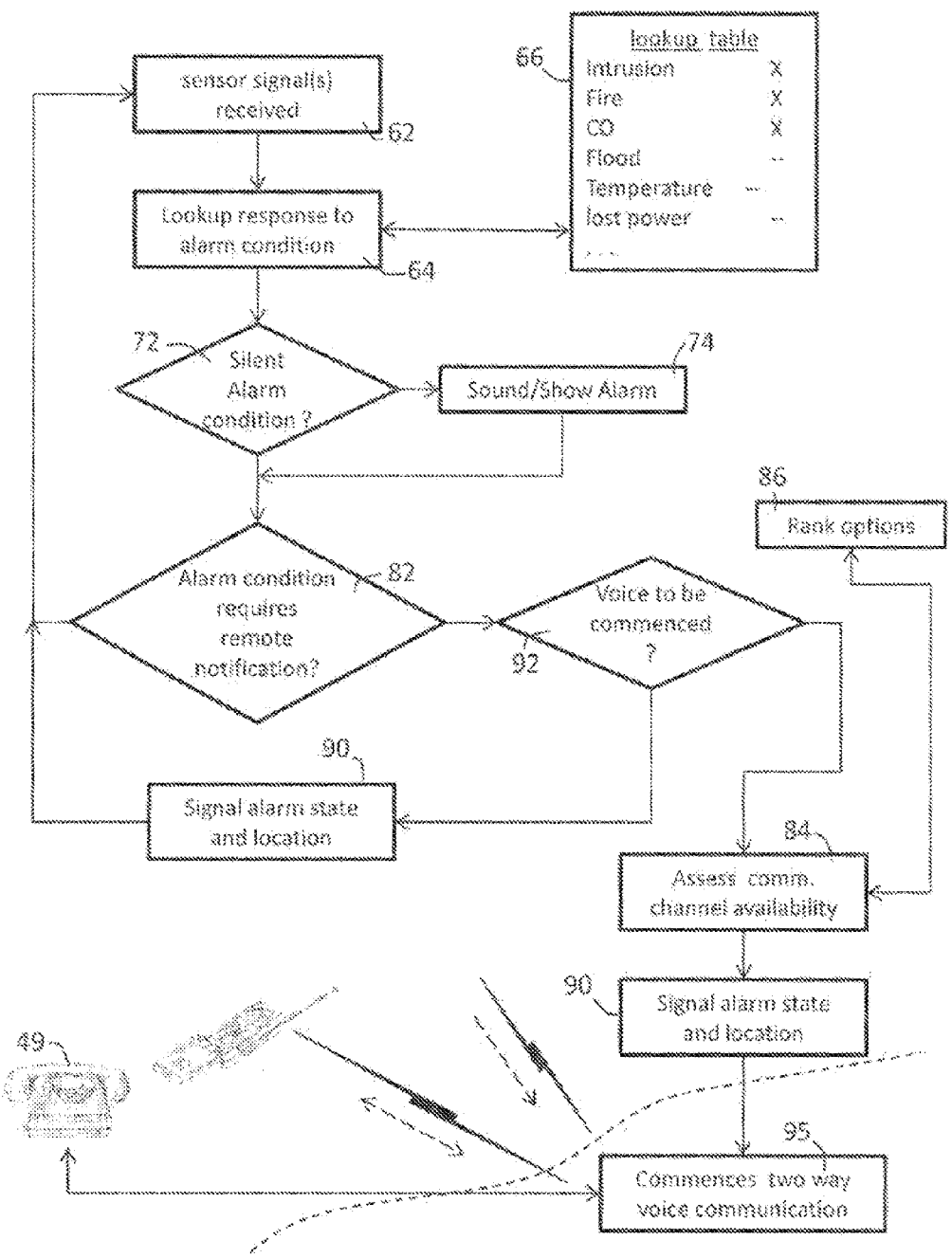
FIG. 3 is a schematic block diagram and flowchart showing operation of an alarm system as in FIG. 1, exemplary of an embodiment of the present invention.

A general flowchart illustration operation is shown in FIG. 3 and may be regarded as an exemplary illustration of the disclosed method. A signal from one of the sensors 18 is received and represents an alarm condition at block 62. Processor 34 (shown in FIG. 2) can distinguish among the plurality of sensors and thus, associates sensors 18 or groups of sensors 18 with distinct alarm conditions. At block 64, the processor refers to a look up table wherein the respective sensors 18 are associated with corresponding hazards, such as intrusion, fire, carbon monoxide, flood, temperature limits, power failure, etc. One or more lookup tables 66 identify the appropriate action to be taken upon occurrence of an alarm event in such categories. According to blocks 72, 74, the alarm events can be distinguished by whether or not a local alarm is generated. As shown by the right column of lookup table 66, the alarm events can be distinguished by those that require (shown by "X") or don't require ("- -") an attempt to call the premises and to engage in two way voice communications with an occupant to obtain further information or security verification assurance. Some alarm conditions optionally are programmable (or identified in table 66) as requiring no remote notification at all as referenced at block 82. A determination is made at block 92 whether or not a voice communication is commenced. For alarm conditions requiring notification, the process proceeds to block 84 to assess channel availability and to rank the options (block 86). For those alarm conditions that will require voice communication ("X" in table 66), the preferred channel for digital reporting is a channel that can serve bidirectional audio after being used for data transmission. For example, GSM voice communication is usually more expensive than other forms of communication. Although PSTN communication is the least expensive communication method, this interface may not always be available for particular alarm systems. Thus, for alarm conditions requiring two way voice sessions, GSM or PSTN (if available) must be used since GPRS does not support two way voice sessions. In addition, the communicator provides dual communication to select a channel for example, GPRS or GSM for transmission of the one or more alarm conditions. Alternatively, the communicator may be configured to send an alarm notification not requiring a two way session over a first communication channel (e.g. GPRS) and another alarm condition requiring a two way session over a second communications channel (GSM, PSTN, etc.). In addition, the communicator may be configured to send a first alarm notification over a first communication channel to a first remote service facility and a second alarm notification over a second communications channel to a second remote service facility In this manner, the system takes advantage of a plurality of available communication channels to send one or more alarm conditions. Finally, the alarm state and location are reported using data communications (block 90) and communications are commenced between the monitoring facility 14 and the premises via telephone set 49 and if necessary through the bridge function of communications interface 36.

According to the disclosed technique, discrimination among alarm conditions is possible for various reasons. As discussed, some conditions may need remote reporting and others may not. The controller can further be operable to distinguish among alarm conditions that require operation of one of an audible and visible alarm signal at the premises. The controller may be arranged to report alarm conditions to different entities, or alternatively to report all reportable alarm conditions to the monitoring service but to commence voice communications with different entities in the event of different alarms.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An alarm system for protecting a premises in conjunction with a remote service, comprising:
    at least one sensor located at the premises, the sensor producing a sensor signal indicative of an alarm condition;
    an alarm controller coupled to the sensor, the alarm controller comprising a processor coupled to a memory, the processor configured to determine whether or not a respective alarm condition requires a two way voice communication with the remote service based on information stored in the memory associated with the respective alarm condition;
    a communications interface coupled between the controller and at least one communications network, wherein the communications interface is responsive to the controller to transmit an alarm reporting signal to the remote service over the communications network, and wherein at least for an alarm condition that does not require said two way voice communications, the alarm reporting signal comprises a reporting message.

2. The alarm system of claim 1, wherein the reporting message identifies the alarm condition and the premises.

3. The alarm system of claim 1, wherein the reporting message is transmitted to the remote service using one of addressing and identifying indicia identifying the alarm condition and the premises.

4. The alarm system of claim 1, wherein the reporting message is transmitted to the remote service using one of a TCP/IP network, a text message network, and modulation of one of an audio frequency and radio frequency network.

5. The alarm system of claim 4, wherein the reporting message is transmitted using a Groupe Special Mobile Short Message Service (GSM/SMS) protocol on a wireless data communication network.

6. The alarm system of claim 5, further comprising at least one telephone receiver set disposed at the premises, and wherein the communications interface is configured to bridge the telephone receiver set into voice communications with the remote service after reporting an alarm condition that requires said two way voice communications.

7. The alarm system of claim 4, wherein the reporting message is transmitted as a digital message on a network that is capable of carrying two way voice communication, the system further comprising at least one telephone receiver set disposed at the premises, and wherein the communications interface is configured to engage the telephone receiver set in voice communications with the remote service after reporting an alarm condition that requires said two way voice communications.

8. The alarm system of claim 1, wherein the controller is further operable to distinguish among alarm conditions that require operation of one of an audible and visible alarm signal at the premises.

9. A method for protecting a premises having an alarm system responsive to sensors on the premises, in conjunction with a monitoring facility, comprising:
    distinguishing among multiple alarm conditions that can occur at the premises by associating with at least some of the alarm conditions a requirement to report respective said alarm conditions to the monitoring facility and associating with certain of the alarm conditions a requirement to attempt to establish voice communications between the monitoring facility and the premises when such certain alarm conditions are reported;
    storing in one of a program of a control processor and a program memory associated with the control processor, an indication of a result of said distinguishing among multiple alarm conditions;
    receiving at the control processor a signal from one of the sensors associated with one of the multiple alarm conditions;
    determining from said one of the control processor and the program memory whether said one of the multiple alarm conditions requires an attempt to establish said voice communications;
    for an alarm condition that requires said attempt to establish said voice communications, ranking multiple information transmission pathways between the monitoring facility and the premises, including with respect to capability to effect two way voice communications and data communications over a same connection;
    determining which of the information pathways is available;
    reporting the alarm condition and identifying the premises in a digital message over an available one of the information pathways selected by said ranking; and
    establishing said voice communications over said one of the information pathways selected by the ranking.

10. The method of claim 9, wherein the information pathways include GSM audio communications service, and at least one of GSM/SMS short message service and GSM/GPRS general packet radio service; wherein the reporting is conducted over one of said GSM/SMS and GSM/GPRS services; and wherein the voice communications are conducted over the GSM audio communications service.

11. The method of claim 10, wherein the information pathways further include public switched telephone network PSTN service, and wherein the reporting is conducted by audio modulated signaling over a PSTN call connection and the voice communications are conducted by two way voice transmission over a same said PSTN call connection after said reporting.

* * * * *